Feb. 23, 1965

R. C. LAYNE 3,170,179

DOCKBOARD UNIT

Filed April 24, 1962

INVENTOR.
RICHARD C. LAYNE

BY
MAHONEY, MILLER & RAMBO
BY Wm. V. Miller
ATTORNEYS.

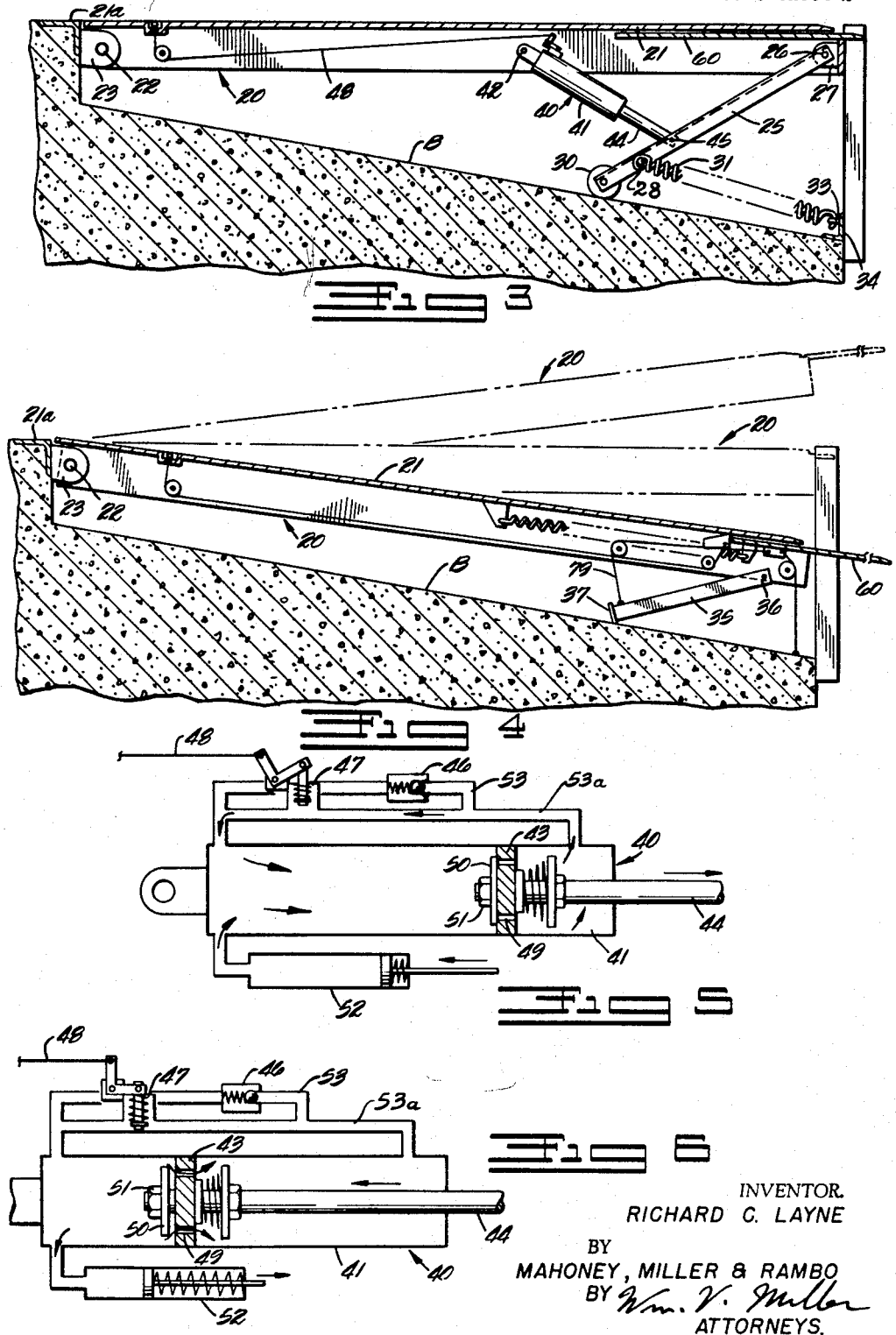

United States Patent Office 3,170,179
Patented Feb. 23, 1965

3,170,179
DOCKBOARD UNIT
Richard C. Layne, P.O. Box 601, Lansdale, Pa.
Filed Apr. 24, 1962, Ser. No. 189,732
1 Claim. (Cl. 14—71)

My invention relates to a dockboard unit. It relates, more specifically, to a unit which includes a dockboard that is mounted on a loading and unloading dock for vertical swinging movement and which is provided with novel fluid-actuated means for controlling its vertical swinging movement.

Various types of dockboard units have been provided in association with truck loading and unloading docks. These units usually include a dockboard which is pivoted for movement between a cross-traffic position, where it is recessed in the dock surface, to a loading position where the outer end of the dockboard overlaps the rear end of a truck bed, which has been backed into association therewith, to facilitate loading and unloading.

According to my invention, the dockboard unit includes a pivoted dockboard or ramp which is so designed that a minimum of framework is required to mount the unit within a pit in the dock which is designed to receive the unit. In fact, the ramp-raising mechanism is designed to cooperate with an inclined bottom on the pit which will serve as a cam surface for cooperating with a cam roller of the ramp-raising mechanism.

The ramp-raising mechanism is of novel structure and includes a raising arm or rocker lever which is pivoted at its upper end to the ramp and which carries the cam roller on its lower end which is always engaged with the inclined bottom pit surface. Biasing means, preferably in the form of springs, act on the arm to keep the cam roller carried thereby in engagement with said inclined surface and these springs tend to swing the arm to a position where it exerts a lifting force on the ram tending to lift it from its normal cross-traffic position. However, I provide fluid-actuated means for normally restraining this movement. This unit is preferably in the form of a cylinder and piston unit connected between the arm and the ramp. Valve means is provided for controlling this unit to permit the biasing springs to raise the ramp. This valve means is such that the vertical swinging of the ramp may be stopped at any desired point. Also, the valve means is such that the ramp can adjust itself to the lowermost level of the bed of the loaded truck associated therewith and can adjust itself upwardly as the truck is unloaded and the bed moves upwardly due to lessening of weight on the truck springs.

The preferred embodiment of my dockboard unit is illustrated in the accompanying drawings wherein similar characters of reference designate corresponding parts and wherein:

FIGURE 3 is an enlarged, longitudinal, vertical sectional view taken along line 3—3 of FIGURE 1, showing the ramp in its lowered cross-traffic position.

FIGURE 4 is a view similar to FIGURE 3 showing the ramp in different vertical positions.

FIGURE 5 is a diagrammatic view of the cylinder and piston hold-down and ramp control unit showing the valve means in condition to permit upward movement of the ramp.

FIGURE 6 is a similar view of the unit showing the valve means in condition to permit downward movement of the ramp.

Figure 1:
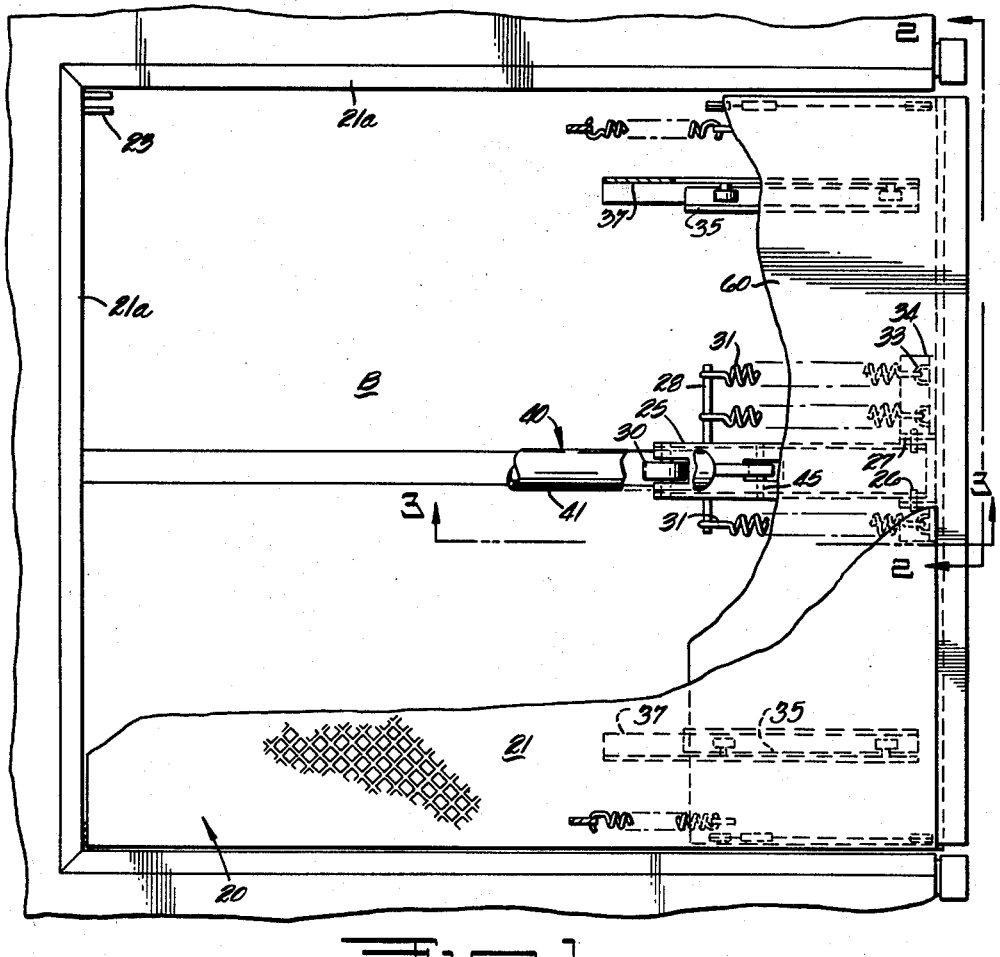
FIGURE 1 is a plan view, partly broken away, of a dockboard unit according to my invention.

With reference to the drawings, FIGURES 1 to 4 illustrate the general structure of this dockboard unit. As previously indicated, the unit is so designed that a minimum of framework is required to mount the unit within the pit shown in the dock and which is designed to receive the unit. In fact, the ramp-raising mechanism is designed to cooperate with the outwardly and downwardly inclined bottom B of the pit which is open at its top and outer sides. The board or ramp 20 is mounted for vertical swinging movement in association with the pit. The ramp is suitably fabricated from supporting beams and cross members which carry on their upper edges a surface plate 21 which, in the lowered cross-traffic position of the ramp, is flush with adjacent surfaces of the dock. A marginal or curb angle 21a is provided around the inner and side edges of the pit opening. The ramp 20 is mounted on this curb angle by means of connecting pivot pins 22 (FIGURES 3 and 4) which cooperate with the pivot lugs 23 carried at the inner corners of the curb angle. Thus, the ramp 20 is pivoted at its inner end for vertical swinging movement and in cross-traffic position is flush with the upper surface of the curb angle 21a although it may swing above or below the sides of the curb angle.

In order to cause vertical swinging movement of the ramp or board 20, suitable mechanism is provided and is supported by the ramp itself. This mechanism includes an arm or bar 25 which is shown as being of bifurcated form which is pivoted at its upper end by a pivot 26 to the outer end of the ramp 20 by means of brackets 27 at the lower side thereof and intermediate the side edges thereof. The bifurcated arm 25 carries at its inner end a cam roller 30. This roller is always in engagement with and operates upon the bottom surface B of the pit which serves as an inclined cam surface for cooperating with the roller. If desired, an embedded roller-contacting metal strip may be provided in this surface.

Figure 2:
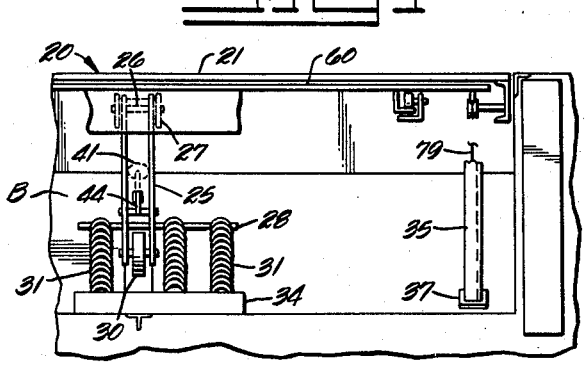
FIGURE 2 is a transverse, fragmentary, sectional view taken at the position indicated at line 2—2 of FIGURE 1.

A set of tension springs 31 tends to swing the associated arm 25 about the pivot axis 26 and keep the roller 30 in engagement with the cam surface B. Each spring of the set is connected at its inner end to a bar 28, that is rigidly carried at the lower end of the arm 25. The outer end of each spring is anchored at 33 to a transversely extending angle member 34 rigidly secured to the surface B at the outer end of the pit. Thus, the springs 31 tend to pivot the arm or lever 25 and cause the roller 30 to produce with the surface B a camming action tending to raise the ramp 20, but this raising is normally prevented by hold-down mechanism which will be described later. In a cross-traffic position, as shown in phantom lines in FIGURE 4, the ramp is supported by pendulum legs 35 which are pivoted at 36 adjacent their upper ends to the outer end of the ramp 20. They are provided with angled feet 37 for engaging the inclined pit bottom surface B as shown in FIGURE 2. These legs are moved into and out of supporting position by a cable 79 which is controlled in the manner disclosed in my copending application filed herewith.

The ramp is preferably provided with a suitable extensible and retractible lip 60 which is adapted to engage the truck bed when the truck is being unloaded. A suitable lip with its associated mounting and control structure is disclosed in my said copending application but does not form a part of this invention. As disclosed in said application, the cable 79 is controlled by movement of the lip 60.

The means for normally preventing forward swinging of the lower end of the rocker arm 25 under the action of the springs 31 comprises the cylinder and piston unit 40. This unit is shown generally in FIGURES 1 to 4 and diagrammatically in FIGURES 5 and 6. It comprises a cylinder 41 which has its inner and upper end pivoted at 42 to the lower side of the ramp 20 rearwardly of the cross-traffic position of the roller 30. The cylinder has a piston 43 slidable therein and a connecting rod 44 which projects from the outer end of the cylinder. This rod 44 is pivoted at its outer and lower end at 45 to the lower portion of the arm 25. Between the opposed ends of the cylinder is a double by-pass. Controlling the lower branch 53a of this by-pass is a control valve 47 which is actuated by a cord or cable 48 which may extend to a suitable location. In the upper portion 53 of this by-pass is a check-valve 46. The control valve 47 is preferably closed by spring pressure and will open automatically under a predetermined excessive pressure. However, it is normally opened by a pull on the cord 48. A reservoir 52 is also connected to the inner end of the cylinder 41. The spring-loaded piston 43 is provided with a check-valve arrangement which includes by-pass ports 49 extending therethrough which are controlled by an associated check-valve disc 50. The piston is mounted for axial movement on the rod but outward movement off the rod is prevented by the disc 50 and a stop nut 51. The spring tends to hold the piston 43 in contact with the disc 50.

In the operation of the ramp, when a pull is exerted on the cord 48, the valve 47 is pulled open (FIGURE 5) and the fluid will be displaced from the outer end of the cylinder 41 to the inner end thereof through the by-pass portion 53a past the open valve 47. Some fluid may flow from the reservoir 52 into the cylinder. At this time the piston 43 is seated on the disc 50 to close the piston ports 49. This permits outward movement of the rod 44 and, therefore, permits the springs 31 to swing the lower end of the arm 25 forwardly thereby raising the forward end of the ramp 20. Check-valve 46 is closed at this time. Upward swinging of the ramp will stop at any time that the cord 48 is released and the valve 47 closes. The springs 31 are of sufficient force to just raise the ramp and, therefore, if the ramp is stepped upon or the weight of a fork-lift truck is applied thereto, the force of the springs will be overcome, causing the ramp to settle down on the truck bed, it being apparent that the lip 60 is extended at this time and the legs 35 are out of supporting position, as disclosed in my copending application. Downward force on the ramp exerts an inward push on the rod 44 (FIGURE 6). Since the piston 43 is under pressure, it moves to the right, away from the disc 51, compressing the spring. This causes the ports 49 to be uncovered by the disc 50 and fluid to be displaced from the inner end of the cylinder to the outer end thereof through the ports 49, the valve 47 being closed at this time and closing the by-pass portion 53a. Some fluid may also be displaced into the reservoir 52. The ramp can continue to lower until it is stopped by the extended lip engaging the truck bed. As the truck is unloaded and the bed rises because of less force on its supporting springs, the ramp will automatically adjust itself upwardly in accordance therewith. This will be permitted when sufficient pressure is applied by the ramp to the cylinder to tend to cause it to move outwardly relative to the rod 44. At this time, the valve means will be in the condition shown in FIGURE 5 except the valve 47 will be closed. Consequently, fluid under pressure will be displaced from the outer end of the cylinder 41, through the by-pass portions 53 and 53a and the check-valve 46 will open allowing the fluid to by-pass through the line portion 53 to the cylinder 41. Thus, the ramp will automatically adjust itself up or down in accordance with the position of the truck when the necessary forces are applied thereto, this being accomplished by check-valves which control flow of fluid relative to the cylinder. At any time, the ramp may be released for automatic upward swinging by a pull on the cord 48 to open the valve 47 and it will settle down automatically to the truck bed when weight is applied thereto with the valve 47 closed.

It will be apparent that there is provided a dockboard which has many features of advantage that have been discussed. Other advantages will be apparent.

According to the provisions of the patent statutes, the principles of this invention have been explained and have been illustrated and described in what is now considered to represent the best embodiment. However, it is to be understood that, within the scope of the appended claim, the invention may be practiced otherwise than as specifically illustrated and described.

Having thus described my invention, what I claim is:

In a dockboard unit for installation in a dock having an inclined pit, a ramp pivotally mounted to the dock for vertical swinging movement, a rocker arm pivotally connected at one end to the ramp and at the other end in sliding contact with the inclined pit floor, a tension spring connected at one end to the arm and at the other end to the pit tending to rotate it to a position to swing the ramp upwardly, a fluid-actuated cylinder and piston unit pivotally connected at one end to the arm and at the other end to the ramp tending to prevent rotating of the arm, said cylinder and piston unit including a cylinder having a bypass between the opposed ends thereof controlled by a manual valve, a check release valve associated with said bypass, a piston in said cylinder and having a check valve for controlling flow of fluid in said cylinder to opposite sides thereof, said check valves controlling a fluid flow from one end of the cylinder to the other in opposite directions.

References Cited in the file of this patent
UNITED STATES PATENTS

| | | |
|---|---|---|
| 697,644 | Moore | Apr. 15, 1902 |
| 2,689,965 | Fenton | Sept. 28, 1954 |
| 2,829,395 | Schlage | Apr. 8, 1958 |
| 2,881,457 | Rodgers | Apr. 14, 1959 |
| 2,908,024 | Holleen | Oct. 13, 1959 |
| 2,948,915 | Vose | Aug. 16, 1960 |
| 2,974,336 | Kelley | Mar. 14, 1961 |
| 3,117,332 | Kelly | Jan. 14, 1964 |